US010213712B2

(12) United States Patent
Chernov et al.

(10) Patent No.: US 10,213,712 B2
(45) Date of Patent: Feb. 26, 2019

(54) LIQUID FILTER ASSEMBLY

(71) Applicant: Haier US Appliance Solutions, Inc., Wilmington, DE (US)

(72) Inventors: Gregory Sergeevich Chernov, Louisville, KY (US); Andrew Krause, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 55 days.

(21) Appl. No.: 15/273,754

(22) Filed: Sep. 23, 2016

(65) Prior Publication Data

US 2018/0085690 A1 Mar. 29, 2018

(51) Int. Cl.
*B01D 35/027* (2006.01)
*B01D 29/15* (2006.01)
*C02F 1/00* (2006.01)

(52) U.S. Cl.
CPC ........ *B01D 35/027* (2013.01); *B01D 29/15* (2013.01); *C02F 1/003* (2013.01); *B01D 2201/295* (2013.01); *B01D 2201/34* (2013.01); *B01D 2201/4084* (2013.01); *C02F 2307/12* (2013.01)

(58) Field of Classification Search
CPC ................. B01D 35/027; B01D 29/15; B01D 2201/4084; B01D 2201/295; B01D 2201/34; C02F 1/003; C02F 2307/12; C02F 2201/004
USPC ....... 210/440, 437, 442, 443, 459, 470, 237, 210/238, 248, 249, 493.2
See application file for complete search history.

(56) References Cited

U.S. PATENT DOCUMENTS

| 3,502,218 | A | * | 3/1970 | Tuffnell | B01D 17/045 210/305 |
| 5,800,159 | A | | 9/1998 | Maughan et al. | |
| 5,919,357 | A | | 7/1999 | Wilkins et al. | |
| 6,235,194 | B1 | * | 5/2001 | Jousset | B01D 29/15 210/206 |
| 6,395,190 | B1 | | 5/2002 | Koslow et al. | |
| 6,426,001 | B1 | | 7/2002 | Fritze | |
| 6,485,641 | B1 | | 11/2002 | McLeod | |
| 7,163,625 | B1 | | 1/2007 | Williamson et al. | |
| 7,419,591 | B2 | | 9/2008 | Aberle et al. | |
| 8,083,074 | B2 | * | 12/2011 | South | B01D 27/08 210/440 |
| 8,151,694 | B2 | | 4/2012 | Jacobs et al. | |
| 8,157,107 | B2 | * | 4/2012 | Weindorf | B01D 35/147 210/130 |

(Continued)

FOREIGN PATENT DOCUMENTS

| DE | 202008002581 U1 | 5/2008 |
| EP | 2353690 A1 | 8/2011 |
| WO | WO2005005013 A1 | 1/2005 |

*Primary Examiner* — Madeline Gonzalez
(74) *Attorney, Agent, or Firm* — Dority & Manning, P.A.

(57) ABSTRACT

A liquid filter assembly is provided for an appliance. The liquid filter assembly may define an axial direction and a radial direction. The assembly may also include a filter medium, a housing, a pair of end caps, one or more interlocking ring, and/or a leveling tube. The filter medium may extend along the axial direction between a first end and a second end. The filter medium may define an interior passage to receive liquid passed through the filter medium. The housing may be disposed about the filter medium. The housing may define a liquid inlet opposite the first end of the filter medium.

16 Claims, 12 Drawing Sheets

(56) References Cited

U.S. PATENT DOCUMENTS

| | | |
|---|---|---|
| 8,177,969 B2 | 5/2012 | Wawrla |
| 2011/0089103 A1 | 4/2011 | Bommi et al. |
| 2014/0202195 A1 | 7/2014 | Hawkins et al. |

* cited by examiner

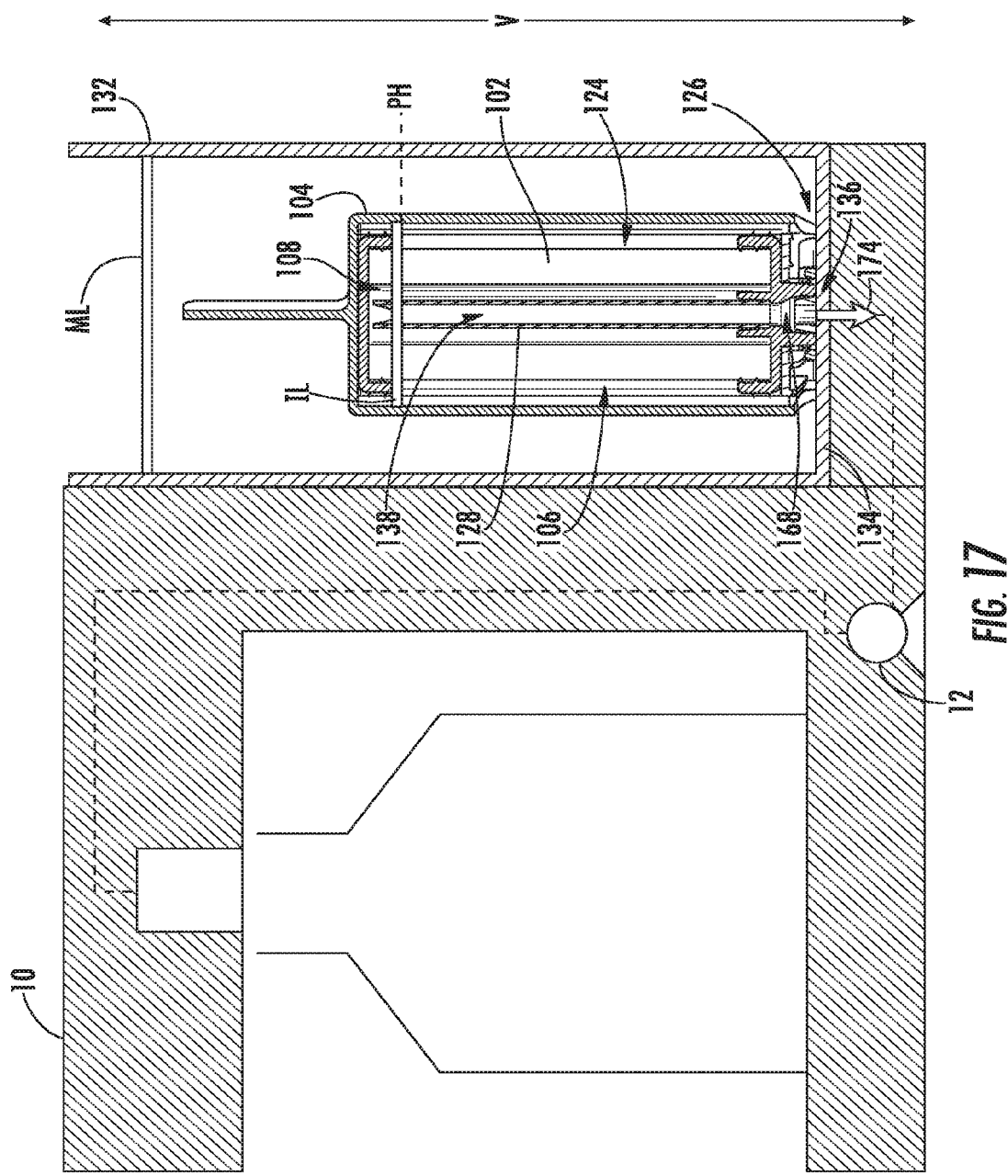

LIQUID FILTER ASSEMBLY

FIELD OF THE INVENTION

The present subject matter relates generally to liquid filtration, and more particularly to liquid filter assemblies for use within an appliance liquid tank.

BACKGROUND OF THE INVENTION

Filters are used in various applications to filter contaminates from liquids before use. For example, a filter may be installed in a refrigerator appliance or ice maker to filter water before the water is output to a user or used to make ice. In other examples, a filter may be installed in a coffee maker to filter water before the water added to coffee grounds or output to a user. In some cases, such as in refrigerator appliance applications, the filter is installed onto a pressurized water supply line such that water flowing through the water supply line is flowed through the filter. However, in other applications, the filter is submerged in a water tank filled with water and a pump is used to draw water from the water tank through the filter. These applications may include stand-alone appliances, referred to herein as non-plumbed appliances, such as coffee makers and countertop ice makers.

Water tanks for non-plumbed appliances typically have a water outlet positioned adjacent to the bottom of the water tank to enable complete draining of water during operation. For the same reason, filters used in such appliances typically include a filter inlet and a filter outlet positioned near the bottom of the filter housing. The efficacy of the filter may be contingent upon the seal joining the filter to the bottom of the tank. For instance, a quality seal is required to ensure the separation of contaminated water upstream to the filter and purified water downstream to the filter. Conventional systems use one or more O-rings provide the seal. However, O-rings typically require secondary operations and/or secondary components to house the O-ring, ensure adequate lubrication, and prevent wear. Moreover, although a seal may be formed at the one or more O-rings, additional support may be required to ensure the filter does not physically separate from the tank. Additional features often complicate installation and increase the overall footprint of the filter. This may limit the potential size, shape, and/or volume of the tank or filter.

Furthermore, mounting the filter at the bottom of a tank may hinder filter performance and/or limit certain uses. Filter media which is disposed within the filter housing might not remain completely submerged by water flowing through the filter housing. The level of water within the filter may be contingent upon the level of water within the tank itself. In some instances, only a fraction of the filter media is actually used for filtration, resulting in instable filtration, increased pressure drop, and imbalanced depletion of the filter media toward the bottom of the filter.

Accordingly, an improved filter for a non-plumbed appliance would be useful. More specifically, a filter assembly addressing one or more of the issues described above would be particularly beneficial.

BRIEF DESCRIPTION OF THE INVENTION

Aspects and advantages of the invention will be set forth in part in the following description, or may be obvious from the description, or may be learned through practice of the invention.

In one aspect of the present disclosure, a liquid filter assembly is provided. The liquid filter assembly may define an axial direction and a radial direction. The assembly may also include a filter medium, a housing, a manifold, a first end cap, and a second end cap. The filter medium may extend along the axial direction between a first end and a second end. The filter medium may define an interior passage to receive liquid passed through the filter medium. The housing may be disposed about the filter medium from a closed end to an inlet end, the closed end being positioned proximate the first end of the filter medium, the inlet end being positioned proximate the second end of the filter medium. The housing may define a liquid inlet at the inlet end. The manifold may include a first protrusion extending toward the filter medium along the axial direction. The first protrusion may define a liquid outlet in fluid communication with the interior passage. The first end cap may be disposed radially inward from the housing at the first end. The first end cap may also be in engagement with the filter medium and the filter housing. The second end cap may be disposed radially inward from the housing at the second end. The second end cap may be in sealed engagement with the filter medium and the manifold. The second end cap may also define a mated passage extending along the axial direction from the interior passage to the liquid outlet.

In another aspect of the present disclosure, a liquid filter assembly is provided. The liquid filter assembly may define an axial direction, a radial direction, and a circumferential direction about the axial direction. The assembly may also include a filter medium, a housing, and a first interlocking ring. The filter medium may extend along the axial direction between a first end and a second end. The filter medium may define an interior passage to receive liquid passed through the filter medium. The housing may be disposed about the filter medium from a closed end to an inlet end, the closed end being positioned proximate the first end of the filter medium, the inlet end being positioned proximate the second end of the filter medium. The housing may also define a liquid inlet at the inlet end. The first interlocking ring may be fixed to the housing to engage a second interlocking ring. Each of the first interlocking ring and the second interlocking ring may include a locking finger. Each locking finger may include a base extending along the axial direction and a platform extending from the base along the circumferential direction.

In yet another aspect of the present disclosure, a liquid filter assembly is provided. The liquid filter assembly may define an axial direction and a radial direction. The assembly may also include a filter medium, a housing, and a leveling tube. The filter medium may extend along the axial direction between a first end and a second end. The filter medium may define an interior passage to receive liquid passed through the filter medium. The housing may be disposed about the filter medium. The housing may define a liquid inlet opposite the first end of the filter medium. The leveling tube may extend along the axial direction between a top portion and a bottom portion. The leveling tube may define a central passage in fluid communication between the interior passage and the liquid outlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 17 provides a cross-sectional side view of an appliance, including a filter assembly mounted therein, according to an example embodiment of the present disclosure.

DETAILED DESCRIPTION

Figure 1:
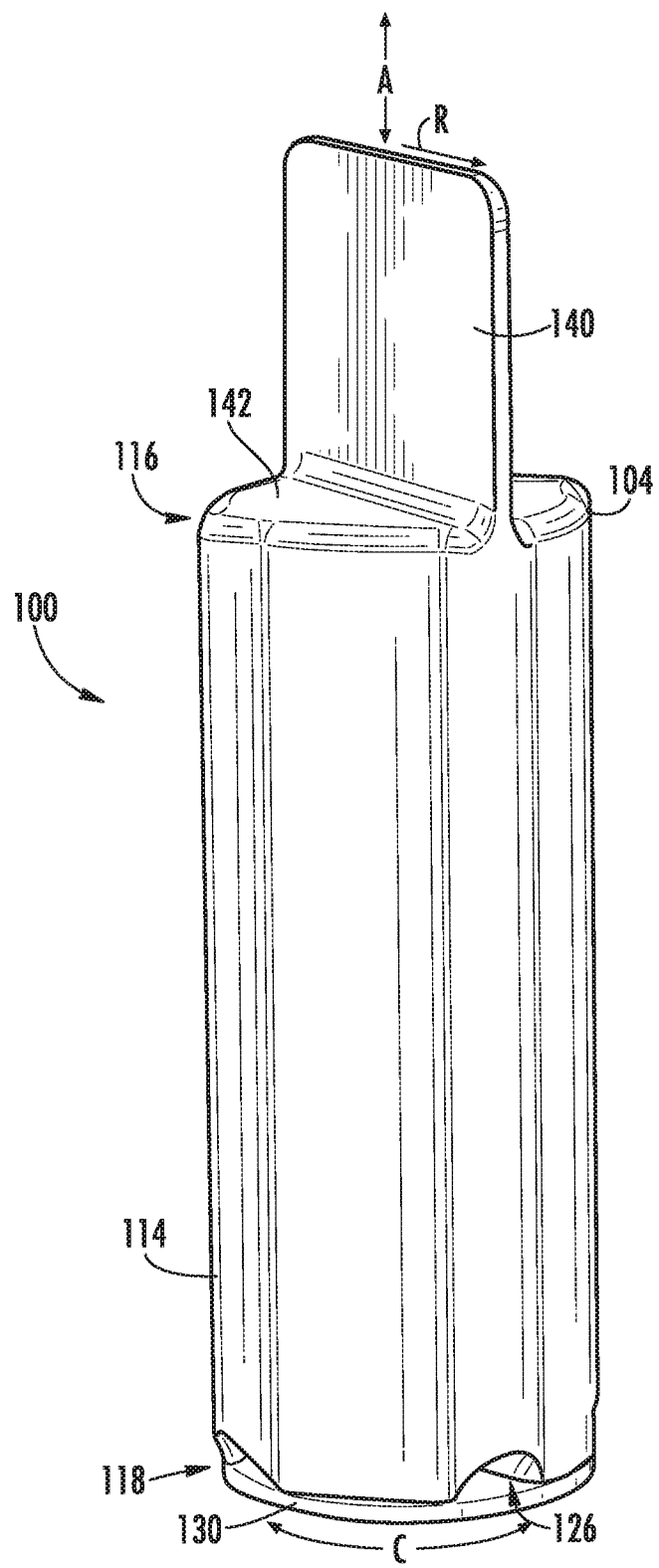
FIG. 1 provides a perspective view of a filter assembly according an example embodiment of the present disclosure.
Figure 2:
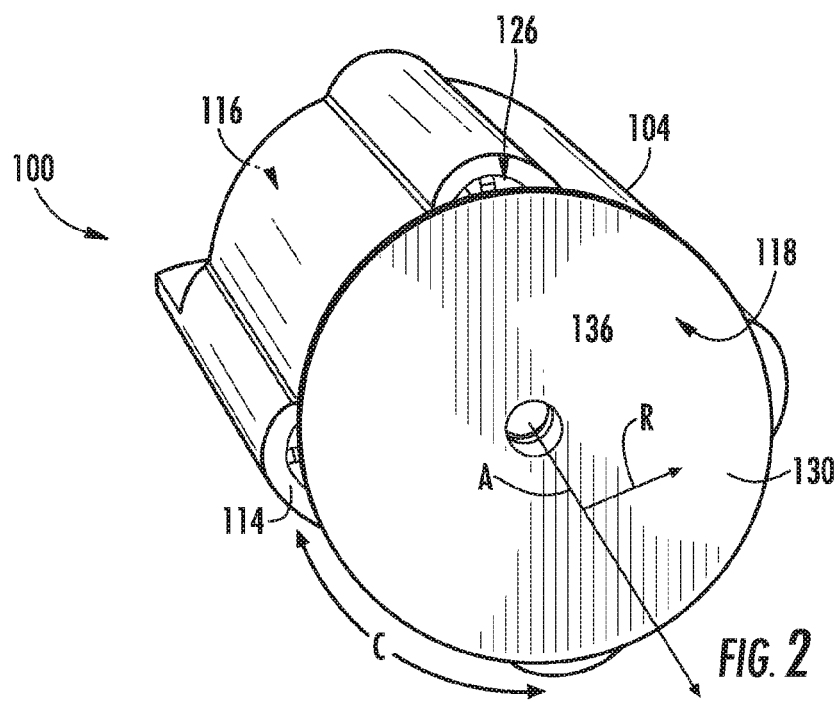
FIG. 2 provides a bottom perspective view of the example filter assembly embodiment of FIG. 1.
Figure 3:
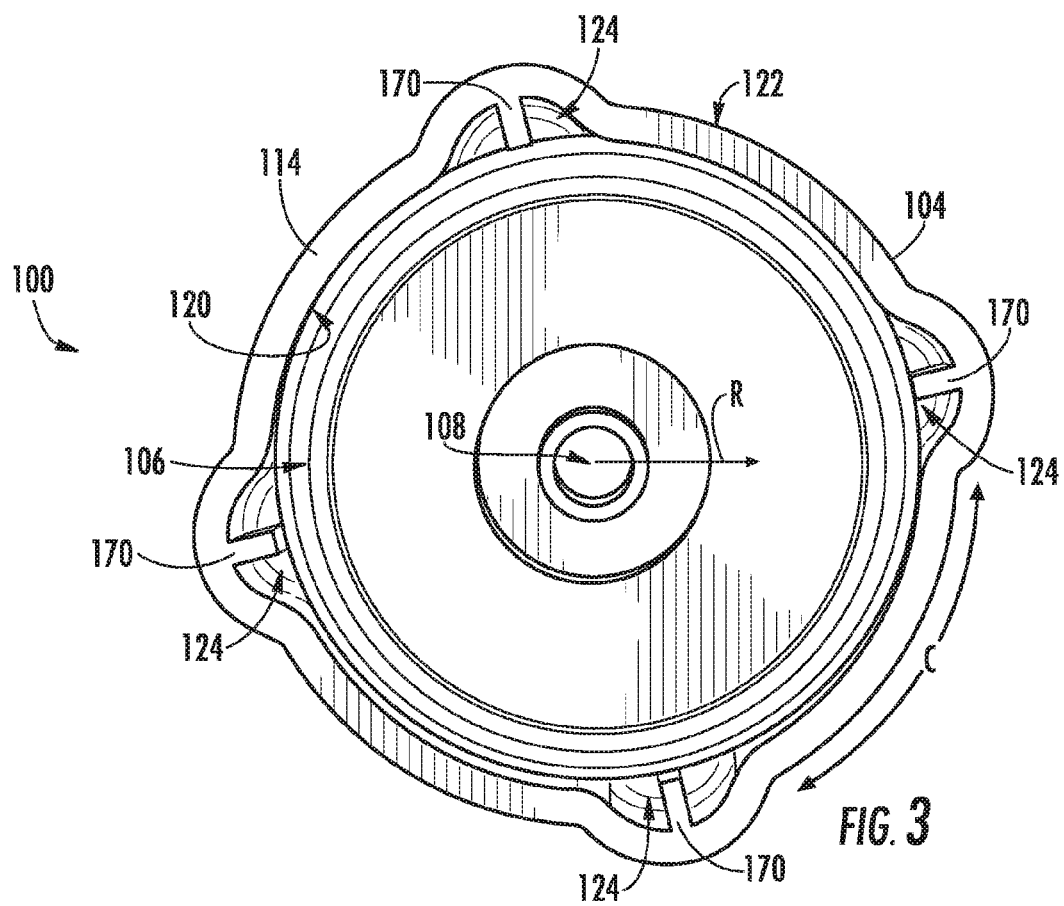
FIG. 3 provides a cross-sectional bottom view of the example filter assembly embodiment of FIG. 1.
Figure 4:
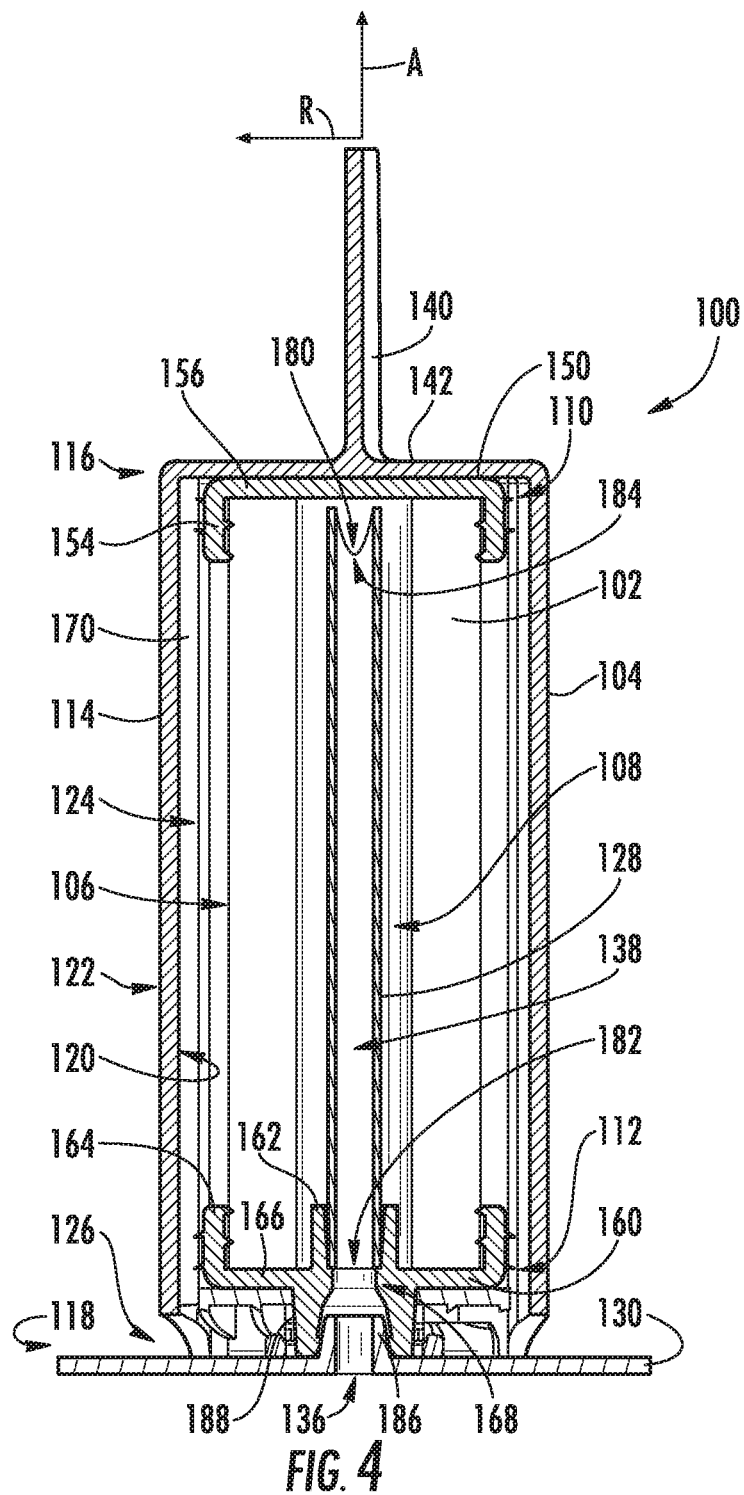
FIG. 4 provides a cross-sectional side view of the example filter assembly embodiment of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is directed generally to filters which may be used in non-plumbed appliances. A non-plumbed appliance is understood to be a stand-alone appliance that does not require plumbing or another water source that is external to the appliance, such as a refrigerator water source. Rather, water can be supplied to the appliance manually by a user, such as by pouring water into a water tank of the appliance. Examples of non-plumbed appliances in accordance with the present disclosure include stand-alone coffee makers (hot-brew or cold-brew) and ice making appliances. It should be understood, however, that the present disclosure is not limited to the above disclosed appliances and rather that any suitable non-plumbed appliance is within the scope and spirit of the present disclosure. Further, it should be understood that the use of filters in accordance with the present disclosure is not limited to non-plumbed appliances.

In general, a non-plumbed appliance includes a water tank (or reservoir). The water tank may define a storage volume into which a user can supply water for use in the non-plumbed appliance. A filter, as discussed herein, may be disposed upright in the storage volume for filtering water in the storage volume before the water exits the storage volume. A non-plumbed appliance may further include a pump in fluid communication with the storage volume for actively flowing water from the storage volume. The filter may filter water that is being actively flowed from the storage volume by the pump. The pump may supply the filtered water to other components of the non-plumbed appliance for various purposes, such as dissolving coffee grounds within a brew chamber to brew coffee or freezing within an icemaker to make ice.

Turning now to the figures, FIGS. 1 through 5 and 15 provide one exemplary embodiment of a liquid filter 100 in accordance with the present disclosure. As shown, filter 100 generally defines an axial direction A, a radial direction R, and a circumferential direction C. Axial direction A may extend longitudinally, and when mounted (e.g., within a non-plumbed appliance 10) axial direction A may be parallel to a vertical direction V. The radial direction R generally extends radially from axial direction A, as well as perpendicular thereto. The circumferential direction C is defined about axial direction A and may be defined in a plane parallel to the radial direction R.

Optionally, filter 100 may be selectively mounted within a non-plumbed appliance 10. As will be described below, a liquid such as water may be directed through the filter (e.g., via pressure from a fluid pump 12) and to a water treatment unit with the appliance. In some such embodiments, water may be treated or used before being delivered to a user-accessible container (e.g., as a new beverage or ice).

Filter 100 generally includes a filter medium 102 that is operable to remove contaminants from water flowing through filter medium 102. Contaminants may include but are not limited to dirt, sediment, sand, rust, lead, cysts, and other debris which may be mechanically filtered from the water, as well as chlorine, chloramine, and volatile organic compounds such as chloroform, lindane, and atrazine which can be adsorbed into pore surfaces in the filter medium 102. Any suitable filter medium 102 may be used, including for example, activated carbon blocks, pleated polymer sheets, spun cord materials, or melt blown materials. In exemplary embodiments, a filter medium 102 may include a bacteriostatic agent such as silver or other additives.

Filter 100 may further include a housing 104 which generally houses the filter medium 102. Accordingly, filter medium 102 in these embodiments is disposed within a filter chamber 106 of housing 104. Further, in exemplary embodiments, filter medium 102 has a hollow cylindrical shape which defines an interior passage 108. Filter medium 102 extends along the axial direction A between a first end 110 and a second end 112. As will be discussed below, water may generally be filtered via a flow path from filter chamber 106, through filter medium 102, and into interior passage 108.

In some embodiments, housing 104 includes a sidewall 114 that extends along the axial direction A between a closed end 116 and an inlet end 118. Sidewall 114 may, for example, have a hollow generally-cylindrical shape coaxial and/or complementary to filter medium 102. An inner wall surface 120 may be directed to or face filter medium 102 (e.g., in the radial direction R) while an outer wall surface 122 is directed away from filter medium 102 to face an ambient environment, such as the storage volume of a water tank (e.g., in the radial direction R). When assembled, housing 106 may be disposed about filter medium 102 from closed end 116 to inlet end 118. As illustrated, at least one filter passage 124 is defined within filter chamber 106, e.g., between inner wall surface 120 of housing 104 and filter medium 102. Filter passage 124 may generally extend along the axial direction A. In some embodiments, filter passage 124 is defined parallel to an outer surface of filter medium 102. In optional embodiments, a plurality of filter passages 124 is provided. Each filter passage 124 may be parallel to the other filter passages 124 and/or axial direction A. Moreover, each filter passage 124 may be spaced apart along the circumferential direction C. In other words, each filter passage 124 may be defined at a different location along the circumferential direction C. In some such embodiments, each filter passage 124 is equally spaced from the others.

In exemplary embodiments, housing 104 defines a liquid inlet 126 at inlet end 118. For instance, liquid inlet 126 may be defined, at least in part, by a perimeter of sidewall 114 at inlet end 118, opposite the first end 110 of filter medium 102. Liquid inlet 126 may extend through sidewall 114, e.g., in the radial direction R, in fluid communication between the inner wall surface 120 and the outer wall surface 122. As illustrated, liquid inlet 126 may be defined at a location below filter medium 102, e.g., along the axial direction A, advantageously directing water to flow through filter passage 124 along the axial direction A before flowing radially across filter medium 102 into interior passage 108. In some embodiments, a plurality of liquid inlets 126 is defined through housing 104. Optionally, each liquid inlet 126 may be defined at a different location along the circumferential direction C. Moreover, each liquid inlet 126 may be equally spaced from the others. In certain embodiments, such as those shown in FIGS. 1 through 5, each liquid inlet 126 corresponds to a discrete filter passage 124. Each liquid inlet 126 may be thus defined in fluid communication with a corresponding filter passage 124. However, in alternative embodiments, multiple liquid inlets 126 may be defined in fluid communication with a shared (e.g., singular) filter passage 124.

As will be described in greater detail below, some embodiments include a leveling tube 128 that defines a central passage 128 and extends along the axial direction A within the interior passage 108.

A manifold 130 is selectively provided in fluid communication with filter housing 104 and filter medium 102. Manifold 130 may be a separate distinct component, or may be integrated into another portion of appliance, such as a base wall 134 of a water tank 132 (see FIGS. 6 and 7). Generally, manifold 130 defines a liquid outlet 136 for delivering filtered water from filter 100. When assembled, liquid outlet 136 is thus downstream from liquid inlet 126. Specifically, liquid outlet 136 may be disposed in downstream fluid communication with interior passage 108 of filter medium 102. When assembled, central passage 138 may be in fluid communication between the interior passage 108 and the liquid outlet 136.

Housing 104 may be constructed from any suitably rigid material. For example, according to the illustrated embodiment, housing 104 is injection molded using a suitable plastic material, such as injection molding grade high impact polystyrene (HIPS) or acrylonitrile butadiene styrene (ABS). A sealed wall 142 is provided at closed end 116. In some embodiments, sealed wall 142 is integrally formed with or connected to sidewall 114 to form a hermetically seal at closed end 116 of housing 104. Optionally, a handle 140 may extend from housing 104 at closed end 116. For instance, as illustrated in FIGS. 1 through 5, handle 140 may be connected or integrally formed with sealed wall 142. When assembled, handle 140 may extend in the axial direction A for convenient user access, e.g., in a vertical direction.

As shown, housing 104 is attached to filter medium 102 during filtering operations. Closed end 116 is positioned proximate or adjacent to first end 110 of the filter medium 102. Inlet end 118 is positioned proximate or adjacent to second end 112 of the filter medium 102. In other words, when housing 104 is attached to filter medium 102, closed end 116 may be closer to first end 110 along the axial direction A than to second end 112. By contrast, inlet end 118 is disposed closer to second end 112 than to first end 110.

In some embodiments, one or more end caps 150, 160 are attached to filter medium 102. For instance, in exemplary embodiments, a first end cap 150 is disposed over filter medium 102 at first end 110. When assembled, first end cap 150 may be disposed radially inward (e.g., closer to axial direction A along the radial direction R) from housing 104. First end cap 150 may include an outer band 154 disposed about filter medium 102 along the circumferential direction C, e.g., at an outermost radial extreme of filter medium 102. Additionally or alternatively, first end cap 150 may include a radial partition 156 extending in the radial direction R across an axial (e.g., uppermost) extreme of filter medium 102. For instance, radial partitions 156 may extend over filter medium at the first end 110 to connect the outer band 154 and cover interior passage 108. Radial partition 156 may be a substantially solid member, optionally sealing a portion of filter medium 102 and interior passage 108.

First end cap 150 and second end cap 160 may be constructed of any suitably flexible and resilient material. For example, first end cap 150 and second end cap 160 may be constructed from molded silicone or thermoplastic elastomers (TPEs). More specifically, end caps 150, 160 may be constructed from TPEs such as thermoplastic polyurethane elastomers, polyether-ester block copolymer thermoplastic elastomer, styrenic block copolymer elastomers, thermoplastic polyolefin elastomer, polyether-block-amide thermoplastic elastomer, and other materials. According to exemplary embodiments, the hardness of the end cap material could range from Shore A 10 to Shore A 60. However, one skilled in the art will appreciate that other materials having a different hardness may be used while remaining within the scope of the present subject matter.

When assembled, first end cap 150 may engage one or both of the filter medium 102 and housing 104. For instance, one portion of first end cap 150 may contact a portion of filter medium 102 while another portion of first end cap 150 contacts a portion of housing 104. A sealed connection may be formed between first end cap 150 and filter medium 102. In some such embodiments, the resilient material of first end cap 150 may advantageously conform to imperfections on the surface of filter medium 102. One friction fit (i.e., interference fit) may be formed between first end cap 150 and filter medium 102, e.g., at a radially-inward or innermost surface of outer band 154. Another friction fit may, additionally or alternatively, be formed between first end cap 150 and housing 104, e.g., at a radially-outer or outermost surface of outer band 154. Optionally, an adhesive may further join first end cap 150 and filter medium 102.

In additional or alternative embodiments, a second end cap 160 is disposed over filter medium 102 at the second end 112. When assembled, second end cap 160 may be disposed radially inward (e.g., closer to the axial direction A along the radial direction R) from housing 104. Second end cap 160 may include an inner band 162 disposed within filter medium 102 along the circumferential direction C, e.g., within the interior passage 108 at an innermost radial extreme of filter medium 102. Additionally or alternatively, second end cap 160 may include an outer band 164 disposed about an outer radial extreme of filter medium 102 along the circumferential direction C, e.g., at an outermost radial extreme of filter medium 102. Second end cap 160 may include a radial partition 166 extending in the radial direction R across an axial (e.g., bottommost) extreme of filter medium 102. For instance, radial partition 166 may extend over filter medium 102 at the first end 110, to connect the inner band 162 and outer band 164 of second end cap 160.

When assembled, second end cap 160 may engage one or both of the filter medium 102 and housing 104. For instance, one portion of second end cap 160 may contact a portion of filter medium 102 while another portion of second first end cap 150 contacts a portion of housing 104. A sealed connection may be formed between second end cap 160 and filter medium 102. In some such embodiments, the resilient material of second end cap 160 may advantageously conform to imperfections on the surface of filter medium 102. One or more friction fit connections may be formed between second end cap 160 and filter medium 102, e.g., at a radially-inward or innermost surface of outer band 164 and/or at a radially-outer or outermost surface of inner band 162. Another friction fit may, additionally or alternatively, be formed between second end cap 160 and housing 104, e.g., at a radially-outer or outermost surface of outer band 164. Optionally, an adhesive may further join second end cap 160 and filter medium 102

In some embodiments, second end cap 160 is provided in sealed engagement with manifold 130. In exemplary embodiments, second end cap 160 defines a mated passage 168 extending along the axial direction A. When assembled, mated passage 168 is provided in fluid communication between the interior passage 108 and the liquid outlet 136. As shown, mated passage 168 extends from interior passage 108 to liquid outlet 136. At least a portion of mated passage 168 may be defined by inner band 162, e.g., a radially-inner or innermost surface of inner band 162, and/or radial partition 166. As will be described in detail below, some embodiments further include protrusion 188 that extends in the axial direction A from second end cap 160 (e.g., in the opposite direction of inner band 162) to define an extended portion of mated passage 168.

In some embodiments, housing 104 includes one or more inner fins 170. As illustrated, each inner fin 170 may extend radially inward (i.e., in the radial direction R toward the axial direction A). For instance, inner fin 170 may extend from inner wall surface 120 of housing 104 toward one or more of the end caps 150, 160. Inner fin 170 may engage one or more end caps 150, 160, e.g., in a friction fit. In some embodiments, inner fin 170 engages first end cap 150. In additional or alternative embodiments, inner fin 170 engages second end cap 160. Optionally, inner fin 170 may extend longitudinally or parallel to the axial direction A along inner wall surface 120 from the inlet end 118 to the closed end 116. A single inner fin 170 may engage both of first end cap 150 and second end cap 160. In certain embodiments, each of a plurality of inner fins 170 is positioned at a different location along the circumferential direction C. Each inner fin 170 may be equally spaced from the others. In certain embodiments, each inner fin 170 corresponds to a discrete filter passage 124. Each inner fin 170 may thus be positioned parallel to a corresponding filter passage 124. Advantageously, inner fin 170 may restrict expansion of first end cap 150 and/or second end cap 170, thereby preventing clogging of passage 124.

Figure 5:
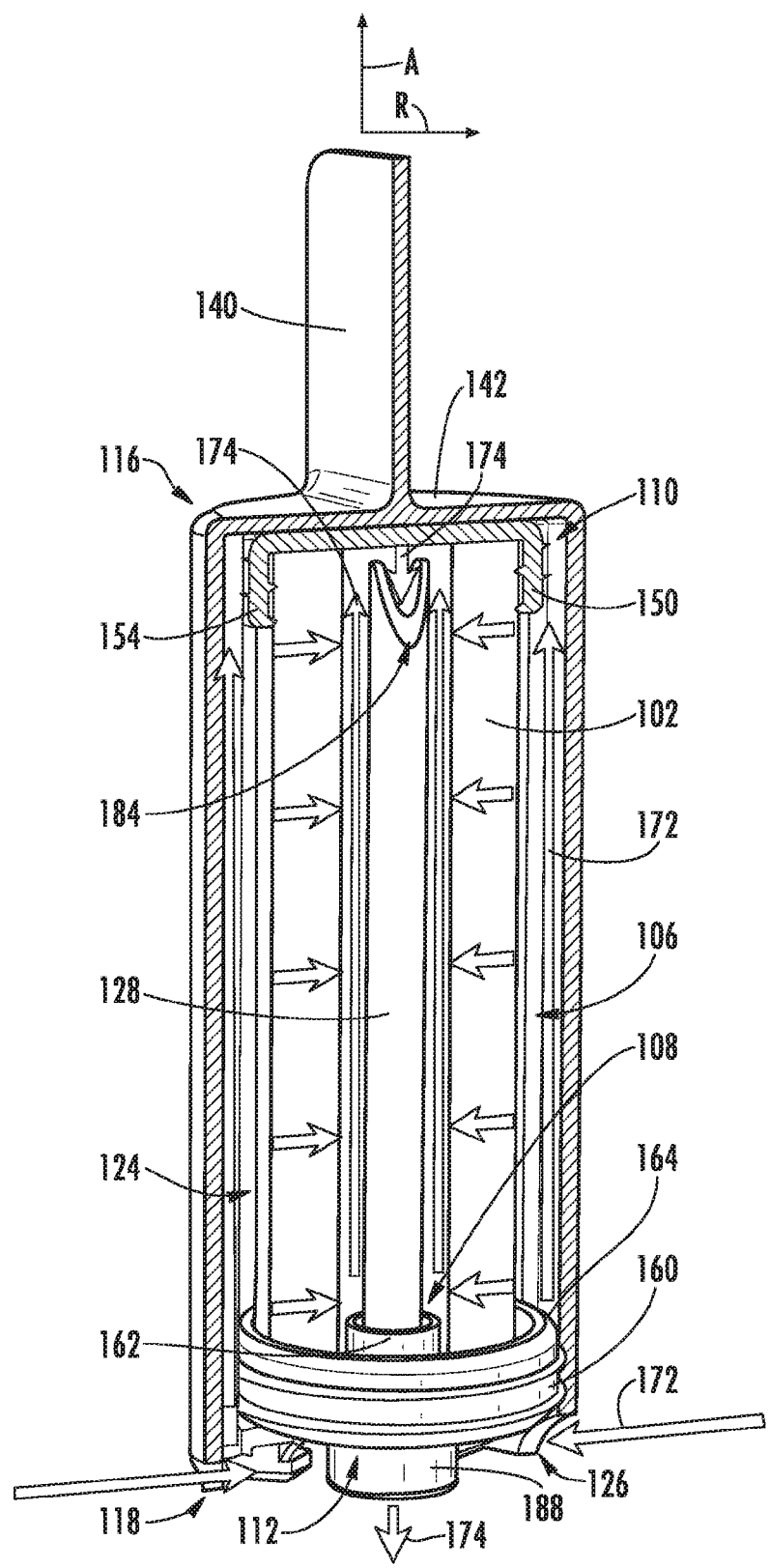
FIG. 5 provides a cross-sectional perspective view of a portion of the example filter assembly embodiment of FIG. 1, illustrating the flow of water therein.

As illustrated in FIG. 5, filter 100 generally defines a flow path for liquid (e.g., water) passing through filter 100. During use, unfiltered water (indicated at arrows 172) may enter filter chamber 106 through one or more liquid inlets 126. From the liquid inlet(s) 126, unfiltered water 172 may travel along a filter passage 124, e.g., in the axial direction A, before passing across or through filter medium 102. Water may thus enter interior passage 108 as filtered water (indicated at arrows 174). From interior passage 108, filtered water 174 may pass through leveling tube 128 and second end cap 160. Specifically, filtered water 174 may travel along central passage 139 to second end cap 160 and mated passage 168. Filtered water 174 may exit second end cap 160 through the mated passage 168 (see FIG. 4) to the manifold 130 (see FIG. 4, e.g., at liquid outlet 136).

Figure 6:
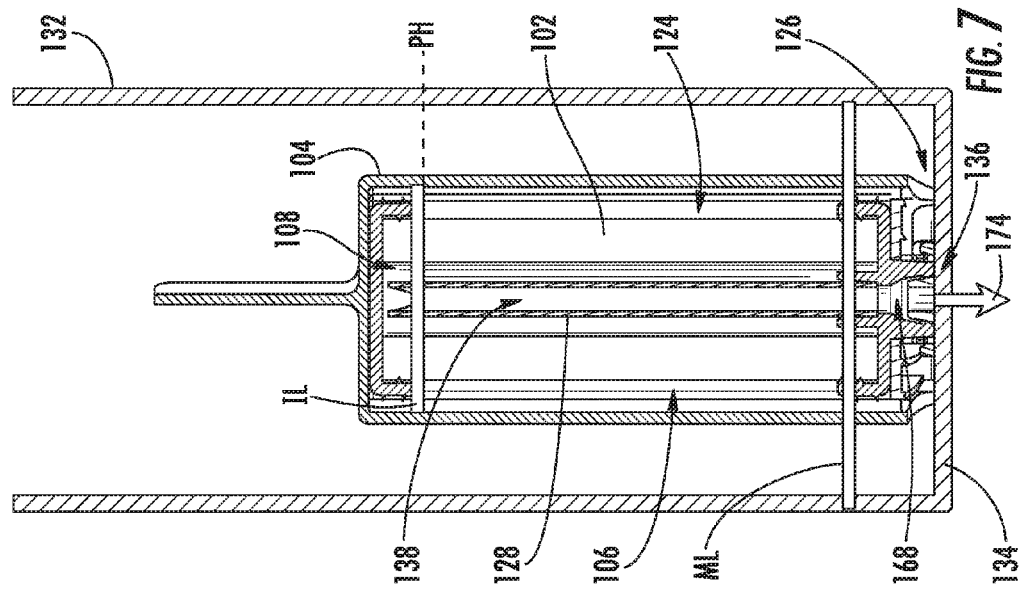
FIG. 6 provides a cross-sectional side view of an example filter assembly embodiments mounted within an appliance tank, wherein water has not yet been directed through the filter assembly.
Figure 7:
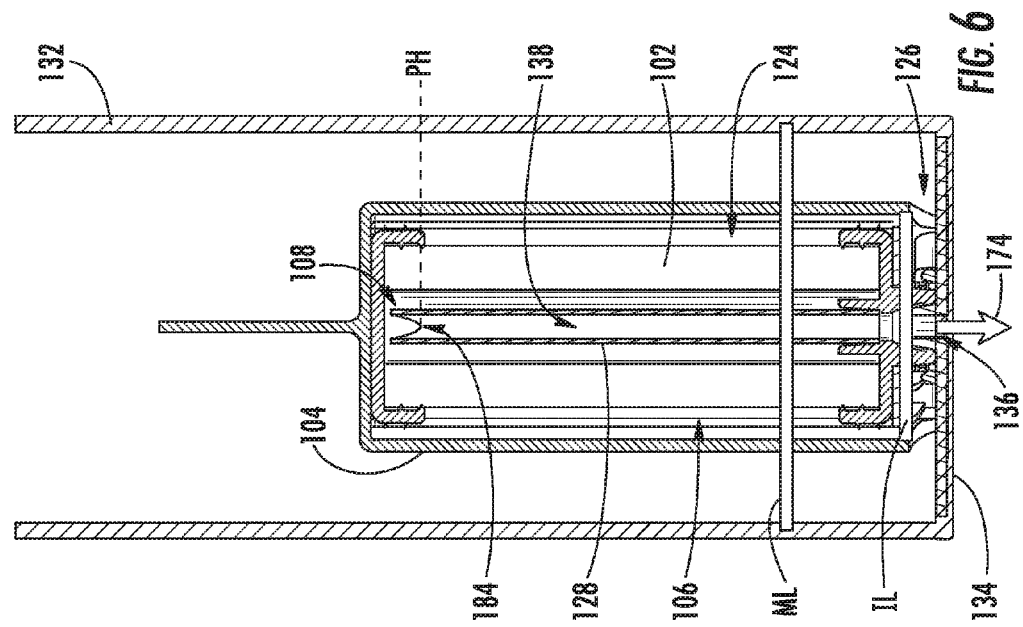
FIG. 7 provides a cross-sectional side view of the example embodiment of FIG. 6, wherein water has been directed through the filter assembly.

Turning now to FIGS. 6 and 7, an example filter 100 is mounted within a water tank 132, e.g., of a non-plumbed appliance. Specifically, filter 100 is mounted upright to manifold 130 and/or base wall 134. Generally, FIG. 6 illustrates a condition wherein filter 100 is mounted within water tank 132, but water has not yet been flowed through filter medium 102—e.g., before an operably-connected fluid pump 12 (see FIG. 17) has been primed. FIG. 7 illustrates a condition wherein filter 100 is mounted within water tank 132 and water has been flowed through the filter medium 102—e.g., after the fluid pump 12 has been primed by the introduction of water through one or more pipes in fluid communication with the water tank 132 and pump 12. As will be detailed, leveling tube 128 may be operable to set and/or maintain a predetermined water level height PH within filter chamber 106 that is distinct from an ambient water level ML.

Figure 8:
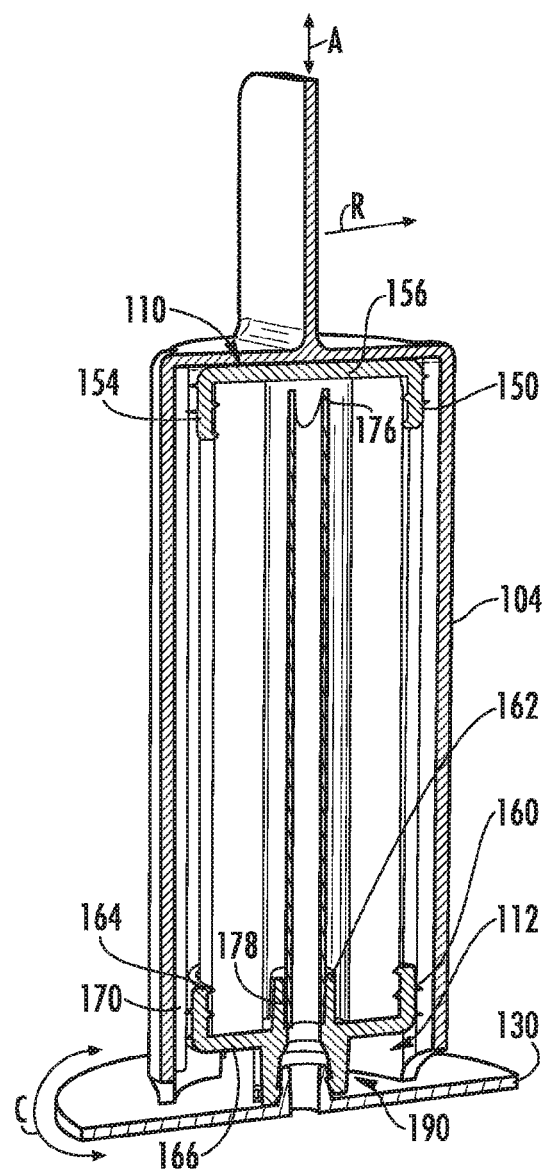
FIG. 8 provides a cross-sectional side view of a filter assembly according to an example embodiment of the present disclosure.
Figure 9:
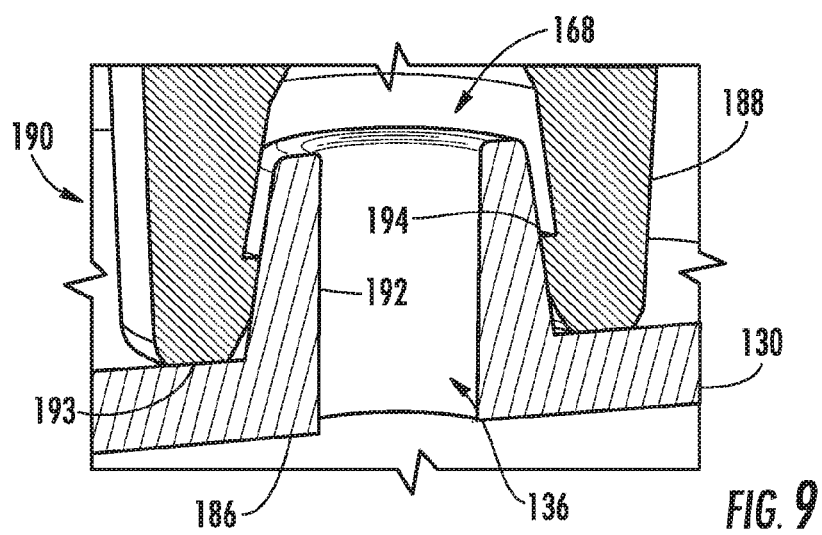
FIG. 9 provides a magnified perspective view of a portion of the example filter assembly embodiment of FIG. 8.

When assembled, leveling tube 128 extends along the axial direction A within interior passage 108. A top portion 176 (FIG. 8) of leveling tube 128 is positioned proximate the first end 110 of filter medium 102 while an opposite bottom portion 178 (FIG. 8) of leveling tube 128 is positioned proximate the second end 112 of filter medium 102. Central passage 138 is generally provided between top portion 176 and bottom portion 178. A top axial opening 180 of leveling tube 128 may be defined at the top portion 176, e.g., parallel to the axial direction A. During use, top axial opening 180 directs water to flow into central passage 138. A bottom axial opening 182 may be defined at the bottom portion 178, e.g., coaxial with top axial opening 180 and/or parallel to the axial direction A. During use, bottom axial opening 182 directs water to flow from central passage 138.

In certain embodiments, a radial opening 184 is defined through leveling tube 128. Radial opening 184 may extend in the radial direction R, e.g., from interior passage 108 to central passage 138. Radial opening 184 may be defined at or otherwise proximate to top portion 176 of leveling tube 128. In some such embodiments, radial opening 184 is a notched aperture defining a continuous void that extends through leveling tube 128 from top axial opening 180. Optionally, multiple radial openings 184 may be defined through leveling tube 128. Additionally, each radial opening 184 may be defined at the same height relative to the axial direction A.

As shown, bottom portion 178 is generally disposed in contact with another portion of filter 100, e.g., second end cap 160, while top portion 176 is free-standing or otherwise unencumbered. Bottom portion 178 may be attached to second end cap 160, e.g., within mated passage 168. In some embodiments, second end cap 160 defines a seat 198 supporting leveling tube 128 (see also FIG. 11), e.g., in the axial direction A. For instance, seat 198 may be defined as a circumferential recess coaxial and complementary to leveling tube 128. When assembled, seat 198 may be operable to hold leveling tube 128 upright and in place within interior passage 108.

During use, leveling tube 128 may generally direct water through filter chamber 106. As an example, filter 100 may be mounted within a water tank 132. An initial height of ambient water level ML is defined by water within water tank 132, e.g., above liquid inlet 126 but below closed end 116 of housing 104 (see FIG. 6). Due, for instance, to air within housing 104, the height of the internal water level IL may only rise to liquid inlet 126, e.g., when filter 100 is initially introduced to water tank 132. However, during use, water may be forced into filter chamber 106 through liquid inlet 126, which is mounted proximate manifold 130 and/or base wall 134, raising internal water level IL to a predetermined height PH within filter chamber 106. Specifically, predetermined height PH may correspond to the height of the radial opening 184 of leveling tube 128. Once the predetermined height PH for water level has been obtained, internal water level IL may be maintained at or above the predetermined height PH (see FIG. 7). As the ambient water level ML within the water tank 132 rises or falls during use of the appliance, internal water level IL may be unaffected. Internal water level IL may remain at or over the predetermined height PH independent of changes in the height of ambient water level ML.

Turning now to FIGS. 8 through 14, exemplary embodiments of filter 100 may be separably attached to manifold 130. In some embodiments, manifold 130 includes a first protrusion 186 that extends toward the filter medium 102 along the axial direction A. First protrusion 186 may extend along the circumferential direction C, e.g., coaxial with mated passage 168, to define at least a portion of liquid outlet 136. Moreover, when assembled, first protrusion 186 may engage second end cap 160. In some such embodiments, second end cap 160 includes a second protrusion 188 that extends along the axial direction A toward manifold 130. Second protrusion 188 may extend along the circumferential direction C, e.g., to define at least a portion of mated passage 168. When assembled, at least a portion of the second protrusion 188 may be disposed radially inward from the first protrusion 186. A sealed engagement, e.g., a friction fit connection, may be formed between first protrusion 186 and second protrusion 188.

In optional embodiments, a complementary sealed connection 190 is provided between second end cap 160 and manifold 130. For instance, in some embodiments, second end cap 160 includes a connection ridge 192 extending radially inward along the circumferential direction C, e.g., at the second protrusion 188. First protrusion 186 includes an engagement face 194 directed radially outward along the circumferential direction C. When assembled, the connection ridge 192 is disposed about engagement face 194 along the circumferential direction C. Connection ridge 192 may deform, e.g., in the radial direction R, in response to contact with radial engagement face 194. Optionally, second end cap includes an axial engagement face 193 that deforms in response to contact with manifold 130. Contact between connection ridge 192 and radial engagement face 194 may thus establish a sealed connection 190 between second end cap 160 and manifold 130. Advantageously, compression between manifold 130 and second protrusion 188 creates vertical a force to provide resistance during filter installation and reduces the potential for undesired movement (e.g., wobbling) of the installed assembly.

Figure 10:
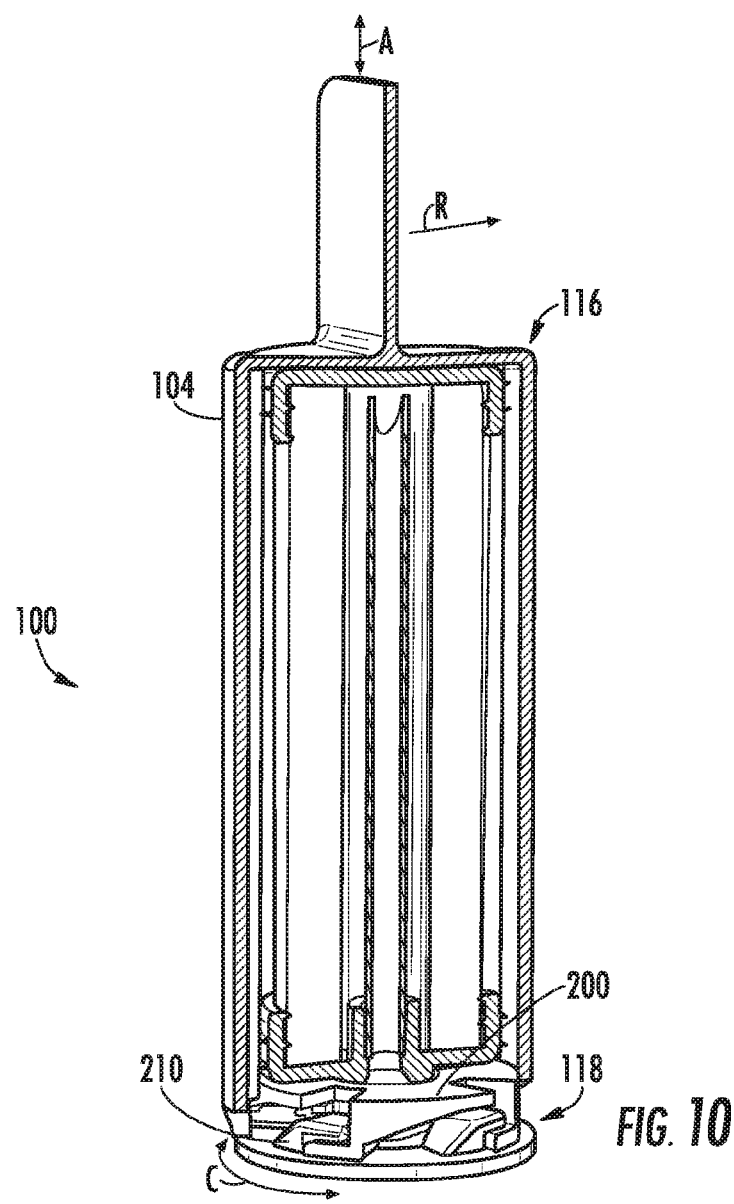
FIG. 10 provides a cross-sectional side view of a filter assembly according to an example embodiment of the present disclosure, including a pair of interlocking rings.
Figure 11:
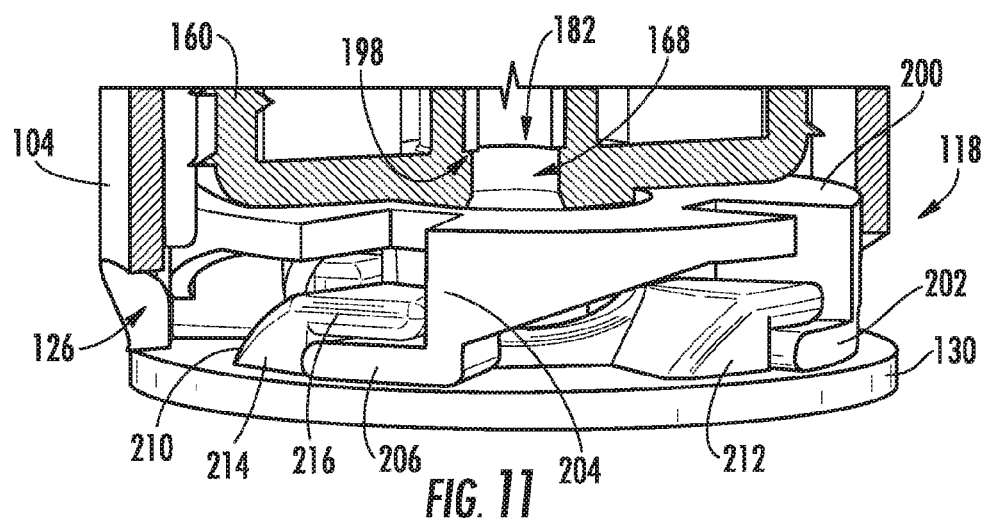
FIG. 11 provides a magnified perspective view of a portion of the example filter assembly embodiment of FIG. 9.
Figure 12:
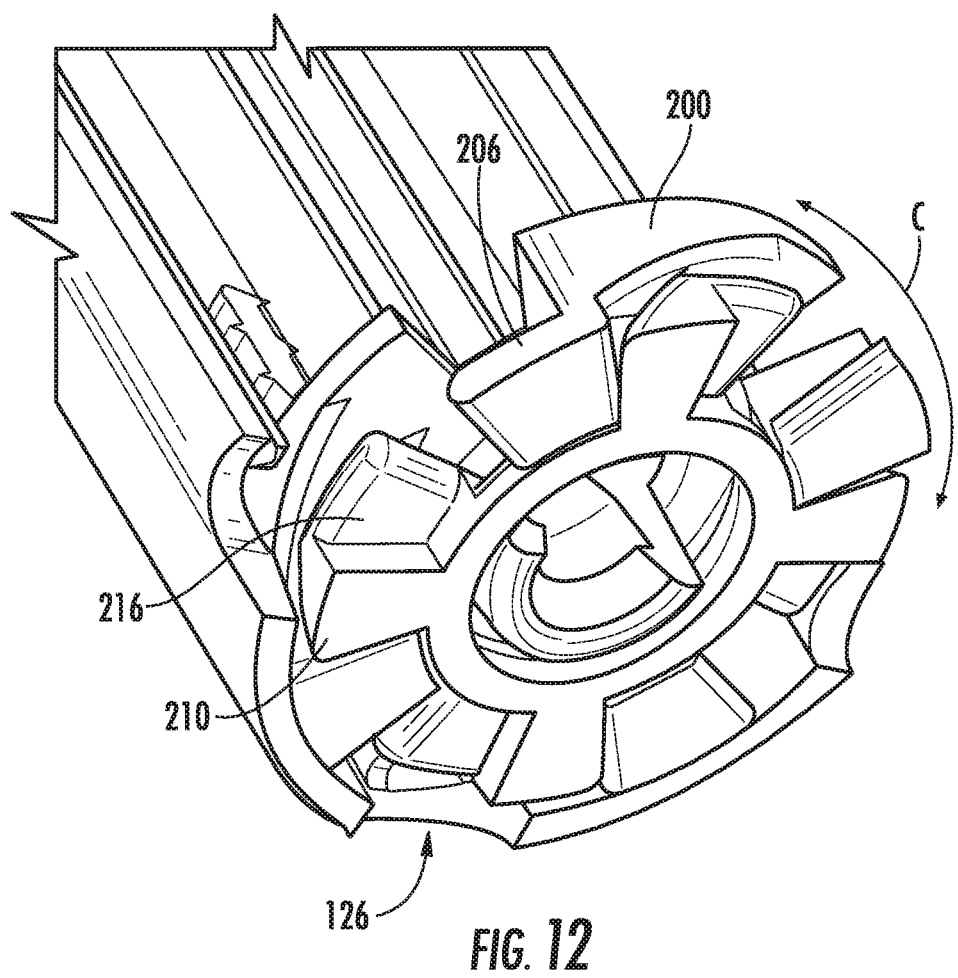
FIG. 12 provides a bottom perspective view of a portion of the example filter assembly embodiment of FIG. 9.
Figure 13:
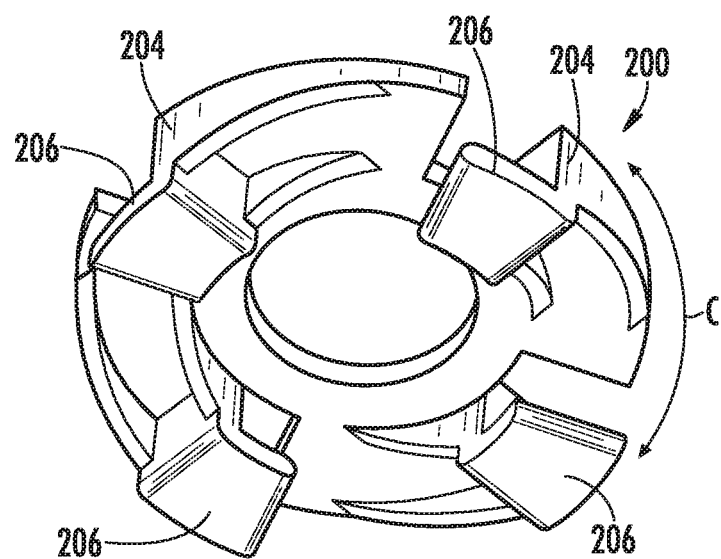
FIG. 13 provides a bottom perspective view of a first interlocking ring included in the example filter assembly embodiment of FIG. 9.
Figure 14:
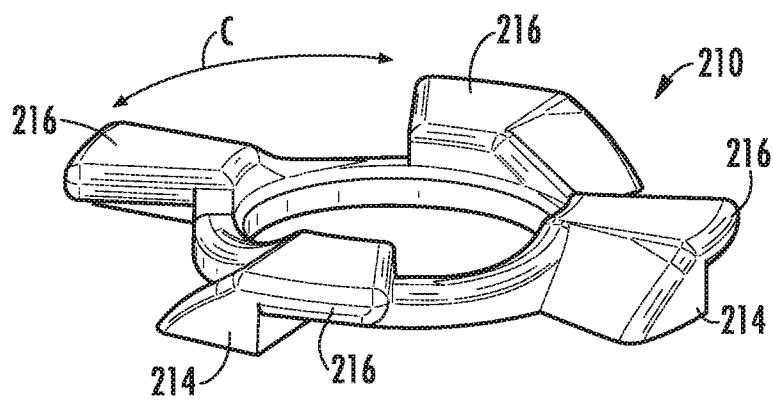
FIG. 14 provides a top perspective view of a second interlocking ring included in the example filter assembly embodiment of FIG. 9.

As shown in FIGS. 10 through 12, a pair of interlocking rings 200, 210 is provided in sealed engagement. The interlocking rings 200, 210 may separably join housing 104 to manifold 130. For instance, a first interlocking ring 200 may be fixed to the housing 104, e.g., at inlet end 118, while a second interlocking ring 210 is fixed to the manifold 130, e.g., about liquid outlet 136 between filter medium 102 and manifold 130. As shown, each interlocking ring 200, 210 includes at least one locking finger 202, 212. Locking finger 202 of first interlocking ring 200 generally complements the corresponding mated locking finger 212 of second interlocking ring 210. Each locking finger 202, 212 includes a connected base 204, 214 and platform 206, 216. As shown, each base 204, 214 extends primarily along the axial direction A. By contrast, each platform 206, 216 extends primarily along the circumferential direction C from its respective connected base 204, 214, perpendicular to the axial direction A.

In some embodiments, first interlocking ring 200 includes a plurality of fingers 202 disposed about liquid outlet 136. Second interlocking ring 210 includes a plurality of fingers 212 matched to fingers 202 of first interlocking ring 200. As illustrated, each finger 202 of first interlocking ring 200 may be spaced apart from an adjacent finger 202 of first interlocking ring 200 along the circumferential direction C. For instance, fingers 202 may be equally spaced along the circumferential direction C. In optional embodiments, each interlocking ring 200, 210, including its respective fingers 202, 212, is disposed radially inward from the housing 104. Viewed from above, the pair of interlocking rings 200, 210 may be hidden by the footprint of housing 104. Advantageously the interlocking rings 200, 210 may secure housing 104 to manifold 130 without increasing the overall radial footprint of filter 100.

During attachment, interlocking rings 200, 210 are generally rotatable along the circumferential direction C. In order to attach, interlocking rings 200, 210 may be first suitably aligned. For instance, interlocking rings 200, 210 may be aligned such that rings are coaxial and platform(s) 206 of first interlocking ring 200 are disposed below platform(s) 216 of second interlocking ring 210. Optionally, engagement between protrusions 186 and 188 may facilitate alignment of interlocking rings 200, 210, e.g., in the radial direction R and/or axial direction A. Upon being suitably aligned, interlocking rings 200, 210 may be rotated between an unlocked position (see FIG. 11) and a locked position (FIG. 12). As shown in FIG. 12, in the locked position, platform(s) 206 of first interlocking ring 200 overlap platform(s) 216 of the second interlocking ring 210 along the circumferential direction C. If housing 104 or manifold 130 is struck or otherwise errantly handled, platform(s) 206 of first interlocking ring 200 may engage platform(s) 216 of second interlocking ring 210, e.g., such that movement of filter 100 in the axial direction is prevented. In the unlocked position, platform(s) 206 of first interlocking ring 200 are spaced apart from platform(s) 216 of second interlocking ring 210 along the circumferential direction C. Clearance is provided between each ring 200, 210. Specifically, clearance is provided between complementary pairs of platforms 206, 216. At least a portion of each base 204, 214 may overlap with an opposite platform 216, 206, e.g., along the circumferential direction C. Axial movement of filter housing 104 and filter medium 102 away from manifold 130 is thus permitted.

Figure 15:
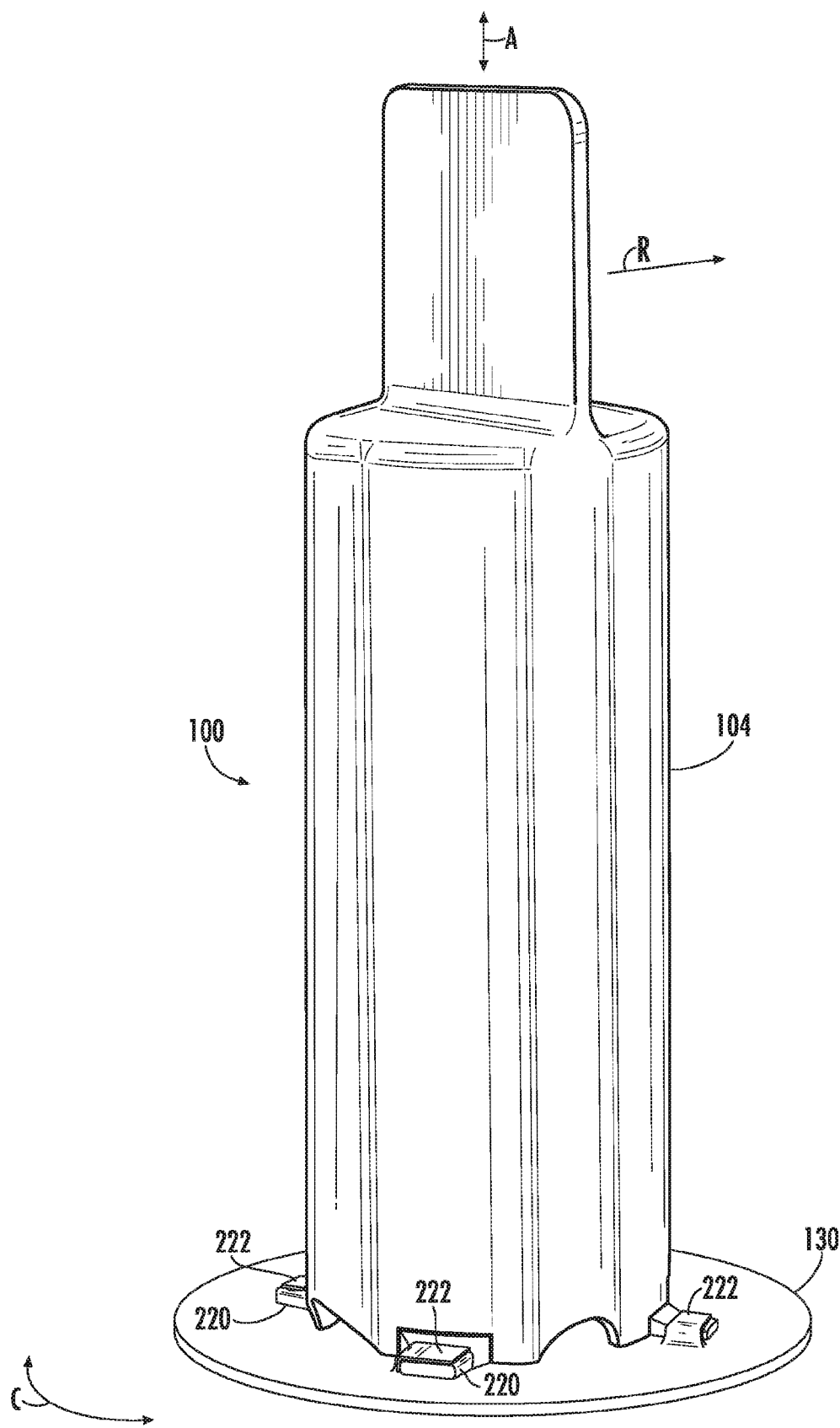
FIG. 15 provides a side perspective view of a filter assembly according to an example embodiment of the present disclosure, including a rotatable interlocking assembly.
Figure 16:
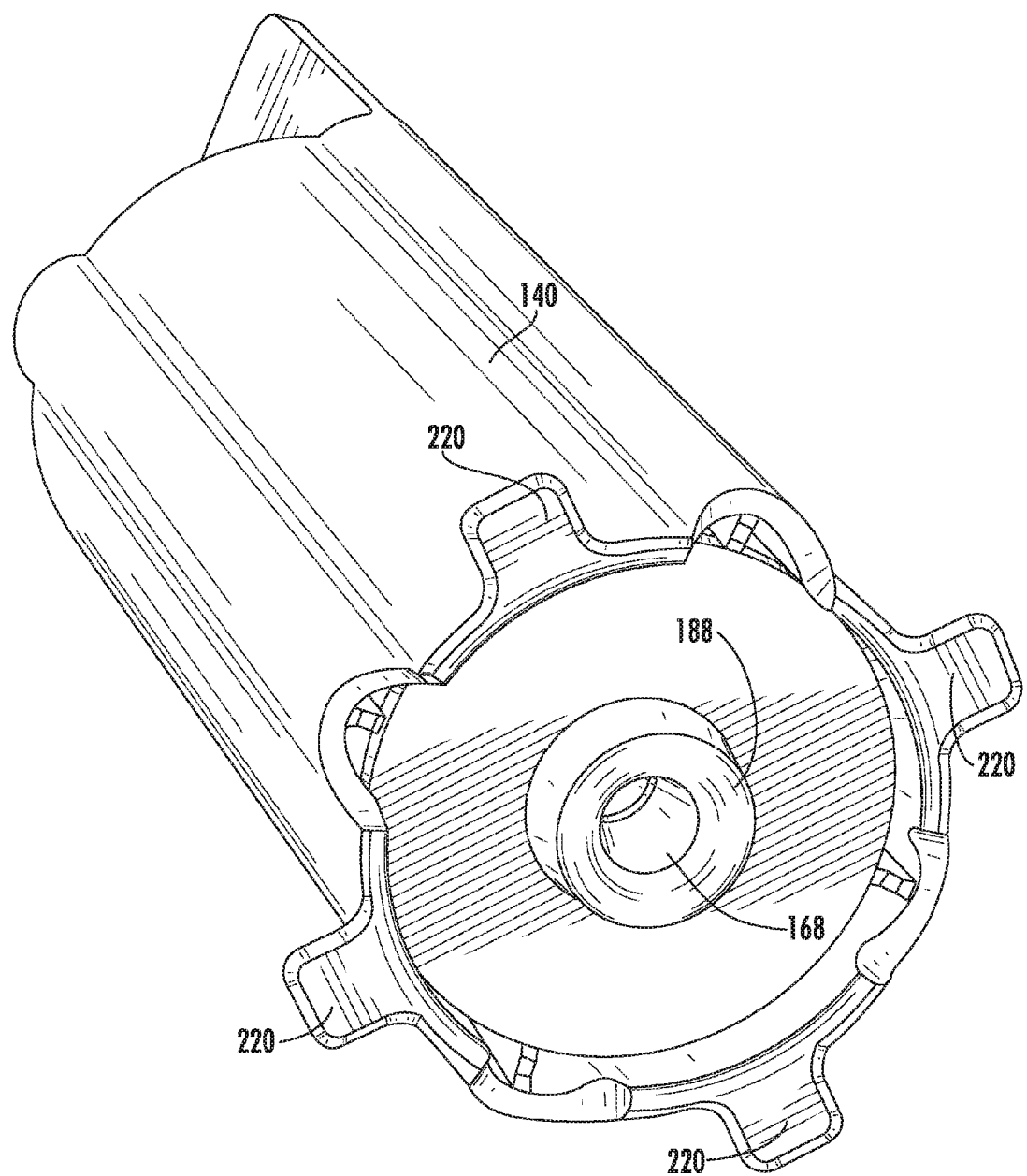
FIG. 16 provides a bottom perspective view of the exemplary filter assembly embodiment of FIG. 15.

It is noted that although a discrete pair of interlocking rings 200, 210 are described above, alternative embodiments may include a distinct rotatable interlocking assembly. For instance, as illustrated in FIGS. 15 and 16, alternative embodiments may include one or attachment tabs 220 extending from housing 104, e.g., in the radial direction R. Attachment tabs 220 may be sized and shaped to engage one or more corresponding mated latches 222 extending, e.g., in the axial direction A from manifold 130. Housing 104 may be rotatable between a locked position (FIG. 15) and an unlocked position (not pictured). As shown, at least a portion of each mated latch 222 may extend above its corresponding attachment tab 220, thereby restricting axial movement of housing 104 in the locked position. Each tab 220 may be spaced apart from an adjacent tab 220 along the circumferential direction C, e.g, equally spaced along the circumferential direction C. During attachment, housing 104 and attachment tabs 220 are generally rotatable along the circumferential direction C to move tabs 220 into and out of engagement with mated latches 222. In other words, between the locked and unlocked positions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A liquid filter assembly defining an axial direction, a radial direction, and a circumferential direction about the axial direction, the liquid filter assembly comprising:
   a filter medium extending along the axial direction between a first end and a second end, the filter medium defining an interior passage to receive liquid passed through the filter medium;
   a housing disposed about the filter medium from a closed end to an inlet end, the closed end being positioned proximate the first end of the filter medium, the inlet end being positioned proximate the second end of the filter medium, the housing defining a liquid inlet at the inlet end;
   a manifold including a first protrusion extending toward the filter medium along the axial direction, the first protrusion defining a liquid outlet in fluid communication with the interior passage;
   a first end cap disposed radially inward from the housing at the first end, the first end cap being in engagement with the filter medium and the filter housing;
   a second end cap disposed radially inward from the housing at the second end, the second end cap being in sealed engagement with the filter medium and the manifold, the second end cap defining a passage extending along the axial direction from the interior passage to the liquid outlet; and
   a first interlocking ring fixed to the housing to engage a second interlocking ring fixed to the manifold, each of the first interlocking ring and the second interlocking ring including a locking finger, each locking finger including a base extending along the axial direction and a platform extending from the base along the circumferential direction.

2. The liquid filter assembly of claim 1, wherein the interlocking rings are rotatable along the circumferential direction between a locked position and an unlocked position, wherein the locked position includes the platform of the first interlocking ring overlapped with the platform of the second interlocking ring along the circumferential direction, and wherein the unlocked position includes the platform of the first interlocking ring spaced apart from the platform of the second interlocking ring along the circumferential direction.

3. The liquid filter assembly of claim 1, wherein the first interlocking ring includes a plurality of fingers disposed about the liquid outlet, and wherein the second interlocking ring includes a plurality of fingers matched to the plurality of fingers of the first interlocking ring.

4. The liquid filter assembly of claim 3, wherein each finger of the first interlocking ring is equally spaced apart from an adjacent finger of the first interlocking ring along the circumferential direction.

5. The liquid filter assembly of claim 1, wherein the pair of interlocking rings is disposed inward from the housing along the radial direction.

6. The liquid filter assembly of claim 1, further comprising a leveling tube comprising a tube extending along the axial direction within the interior passage, the leveling tube defining a central passage in fluid communication between the interior passage and the liquid outlet.

7. A liquid filter assembly defining an axial direction and a radial direction, the liquid filter assembly further defines a circumferential direction about the axial direction, the liquid filter assembly comprising:
   a filter medium extending along the axial direction between a first end and a second end, the liquid filter medium defining an interior passage to receive liquid passed through the filter medium;
   a housing disposed about the filter medium from a closed end to an inlet end, the housing defining a liquid inlet opposite the first end of the filter medium;
   a manifold defining a liquid outlet in fluid communication with the interior passage;
   a leveling tube comprising a tube extending along the axial direction between a top portion and a bottom portion, the leveling tube defining a central passage in fluid communication between the interior passage and the liquid outlet, wherein the top portion is positioned proximate to the first end, wherein the bottom portion is positioned proximate to the second end, and wherein the leveling tube defines an opening at the top portion upstream from the liquid outlet;

a first end cap disposed within the housing at the first end in engagement with the filter medium and the filter housing;

a second end cap disposed radially inward from the housing at the second end in sealed engagement with the filter medium, the second end cap defining a passage extending along the axial direction from the leveling tube to the liquid outlet; and a pair of interlocking rings, including a first interlocking ring fixed to the housing and a second interlocking ring, each of the first interlocking ring and the second interlocking ring including a locking finger, wherein each locking finger includes a base extending along the axial direction and a platform extending from the base along the circumferential direction.

8. The liquid filter assembly of claim 7, wherein the opening is a radial opening.

9. The liquid filter assembly of claim 7, wherein the second end cap defines a seat supporting the bottom portion of the leveling tube.

10. The liquid filter assembly of claim 1, wherein the housing includes an inner fin extending inward in the radial direction to engage the first end cap.

11. The liquid filter assembly of claim 1, wherein the second end cap is disposed in engagement with the housing.

12. The liquid filter assembly of claim 11, wherein the housing includes an inner fin extending inward in the radial direction to engage the second end cap.

13. The liquid filter assembly of claim 1, wherein the housing defines a plurality of parallel passages extending in the axial direction, each parallel passage being spaced apart from the other parallel passages in the circumferential direction.

14. The liquid filter assembly of claim 1, wherein the passage includes a connection ridge extending radially inward along the circumferential direction, wherein the protrusion of the manifold includes an engagement face disposed radially outward along the circumferential direction, and wherein the connection ridge is disposed in sealed engagement with the engagement face.

15. The liquid filter assembly of claim 1, wherein the second end cap includes a second protrusion extending along the axial direction in sealed engagement with the manifold.

16. The liquid filter assembly of claim 1, further comprising a leveling tube comprising a tube extending along the axial direction within the interior passage, the leveling tube defining a central passage in fluid communication between the interior passage and the liquid outlet.

* * * * *